Patented Sept. 24, 1935

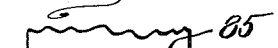
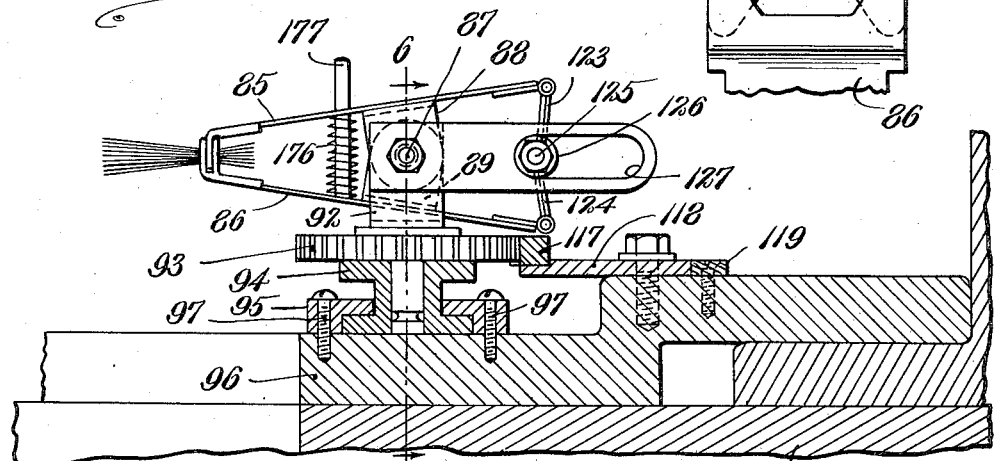
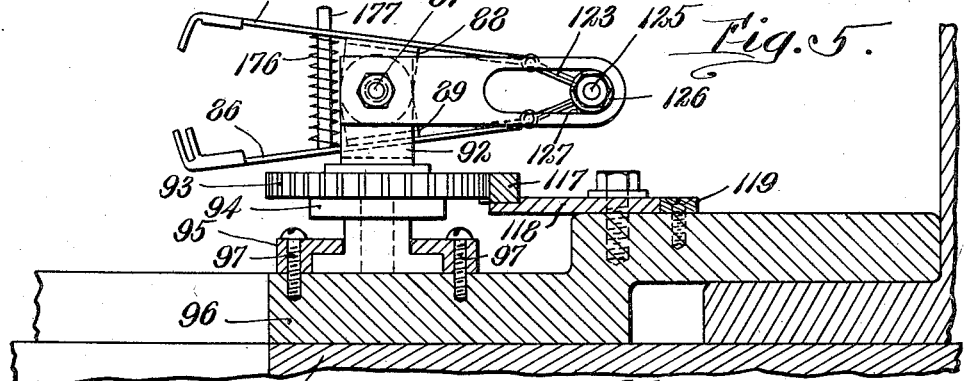
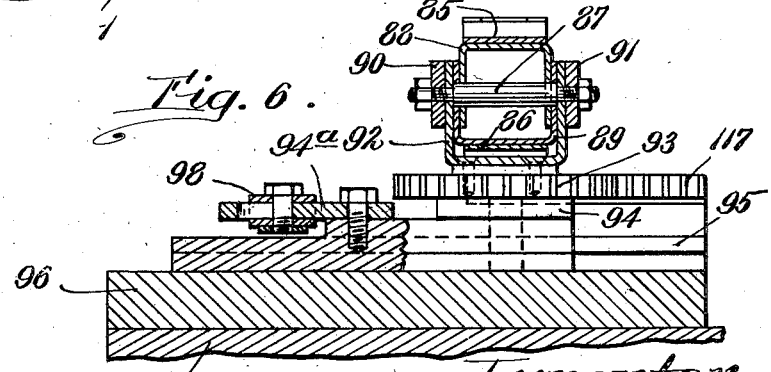

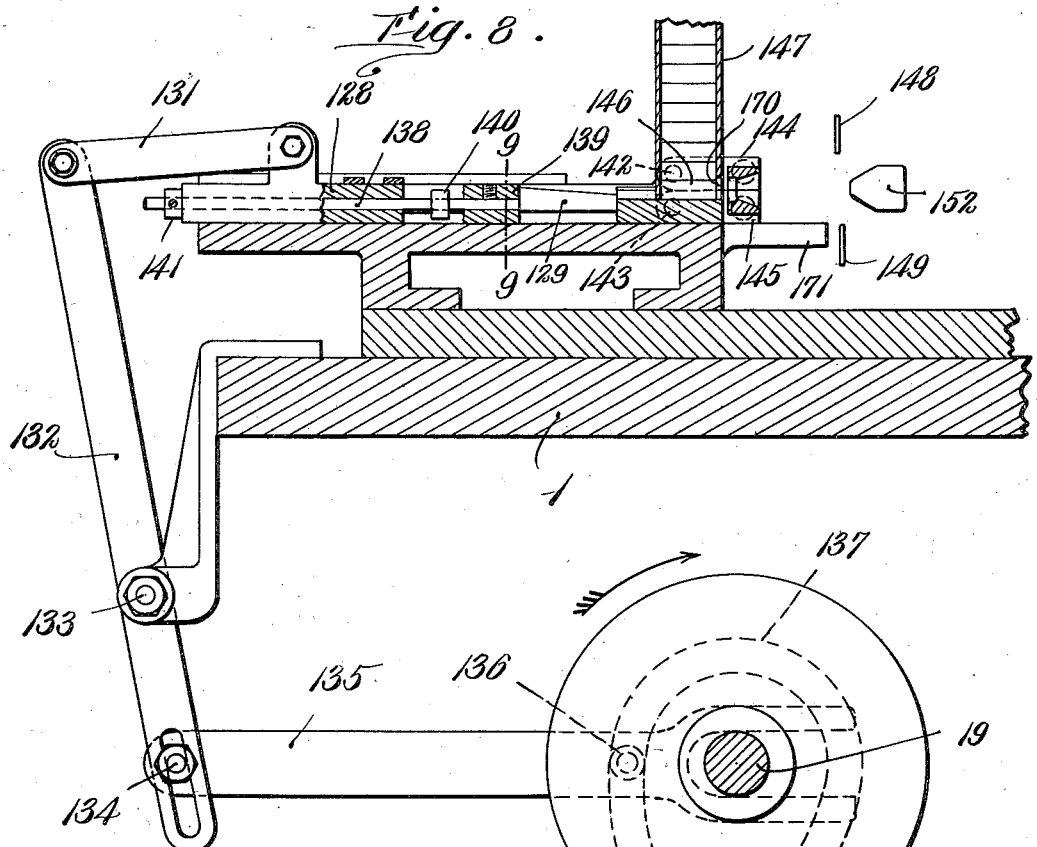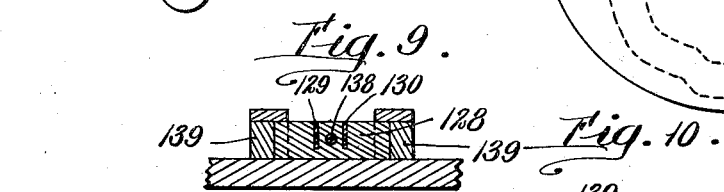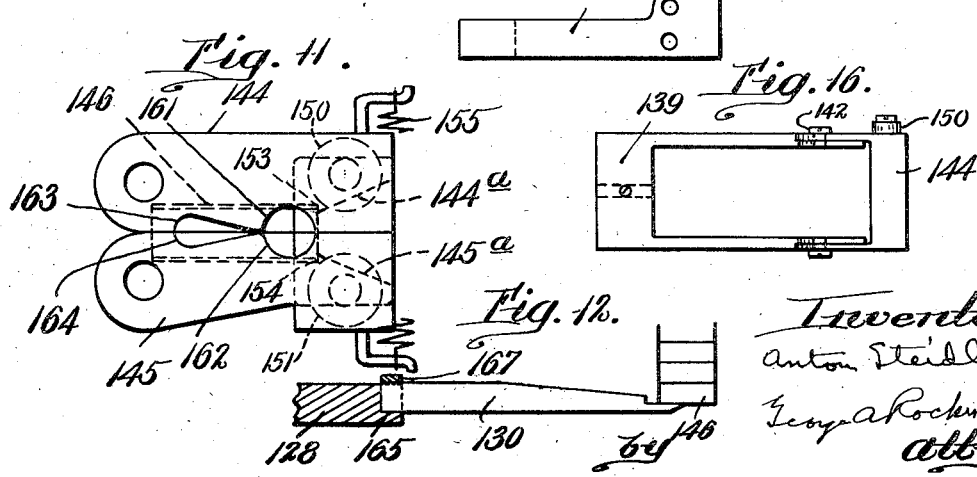

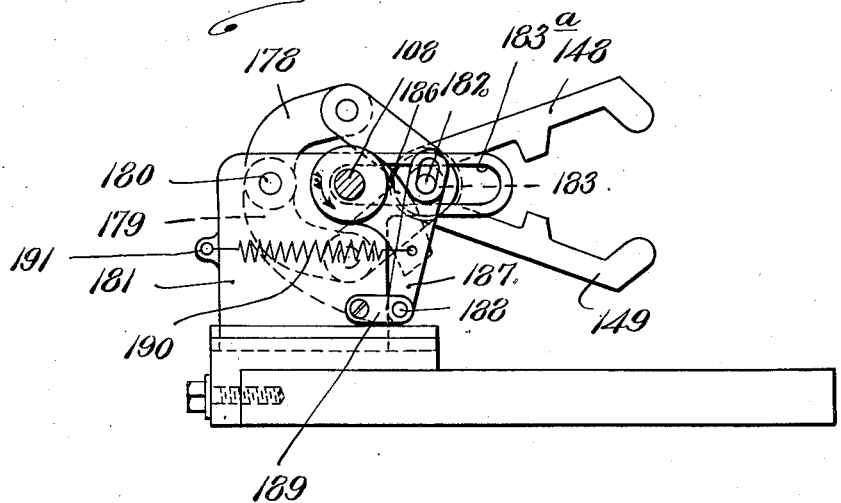
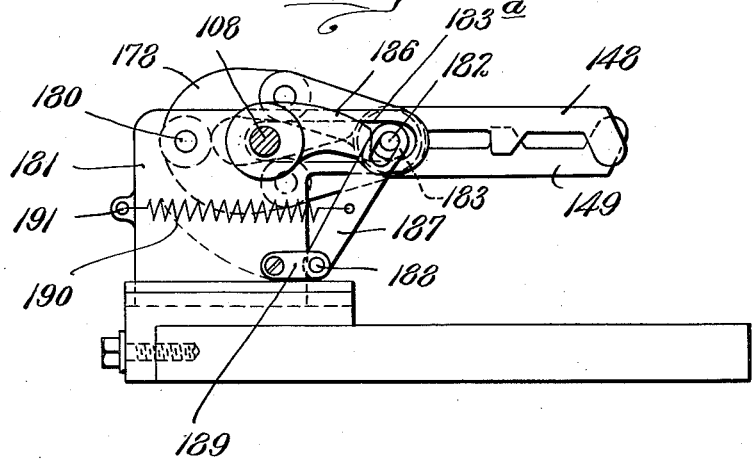

2,015,326

UNITED STATES PATENT OFFICE 2,015,326

MACHINE FOR INSERTING BRISTLES IN FERRULES

Anton Steidle, Arlington, Mass.

Application July 27, 1932, Serial No. 624,974

10 Claims. (Cl. 300—4)

The principal object of my invention is to provide a machine, preferably automatic, for inserting bristles into ferrules preparatory to making complete brushes.

A feature of my invention is mechanism for inserting bristles into ferrules and this with great speed and with great accuracy.

Another feature is a secondary member for feeding the supply of bristles.

Another feature is a tapper for evening up the ends of the bristles.

Numerous other features will be pointed out below.

In the drawings

Figure 4 is a section on line 4—4 of Figure 2;

Figure 5 is a section similar to Figure 4, showing the jaws open;

Figure 6 is a section on line 6—6 of Figure 4;

Figure 7 is a detail end elevation described below;

Figure 8 is a section on line 8—8 of Figure 2;

Figure 9 is a detail section on line 9—9 of Figure 8;

Figure 10 is a side elevation of one of the sliding members shown in Figure 8;

Figure 11 is a side elevation of the ferrule-carrying jaws;

Figure 12 is a detail view of the ferrule-pushing mechanism;

Figure 13 is a side view of the gripping jaws shown in open position;

Figure 14 is a similar view showing the gripping jaws in closed position;

Figure 16 is a plan of the slide and other parts described below.

Figure 1:
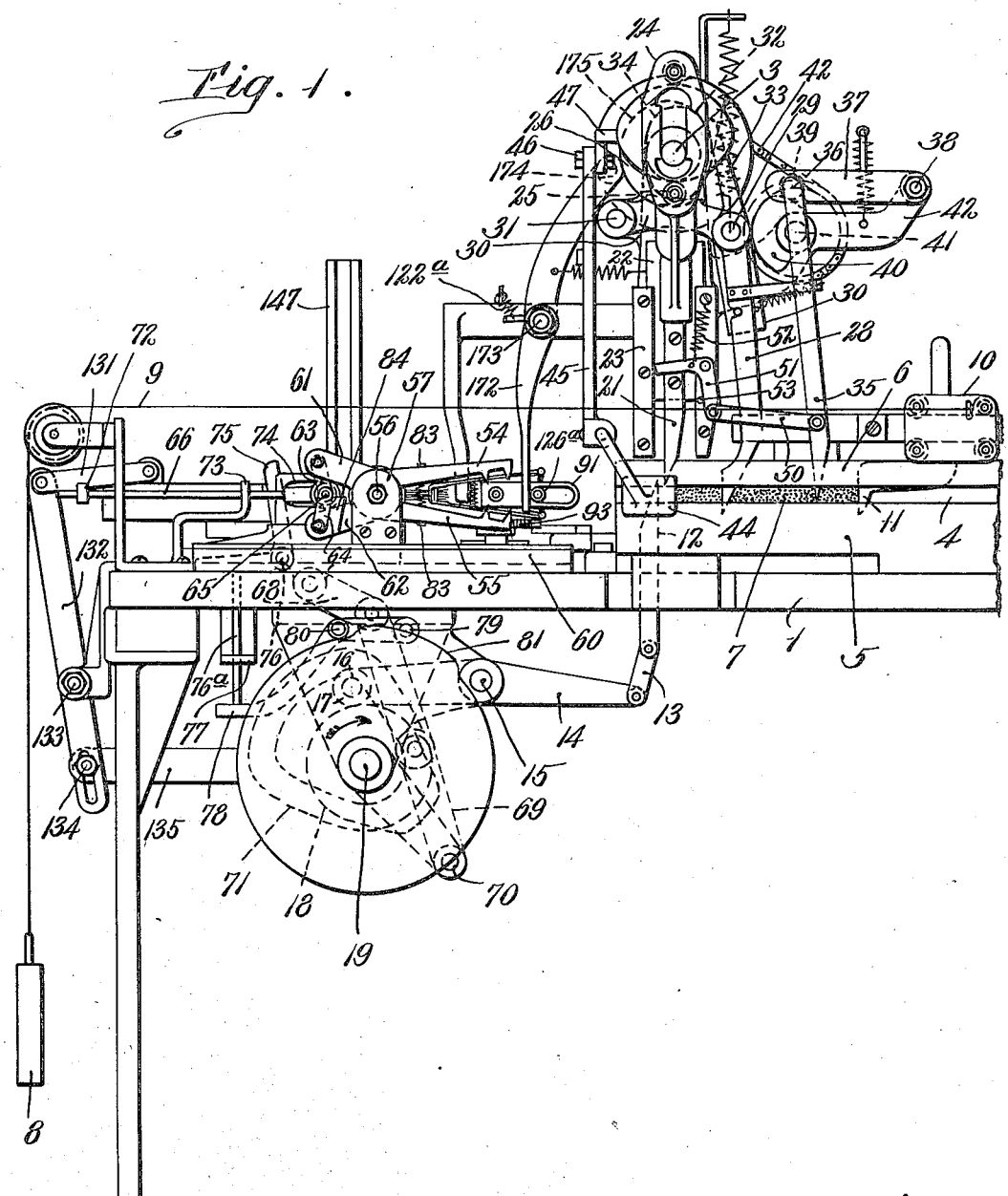
Figure 1 is a front elevation of a machine embodying my invention.

On a suitable bed 1 is mounted an upright frame 2 supporting horizontal shaft 3 on which are mounted various parts referred to below.

Supported on bed 1 is raceway 4 between members 5 and 6 to receive a large quantity of bristles 7 extending transversely of the machine, the member 6 being a support. Weight 8, acting through cord 9 and carriage 10 and beat-up member 11, tends to advance the bristles in the raceway against stop 12, the latter being reciprocated through member 5 by link 13 and lever 14, the latter being pivoted at 15 and its end 16 carrying a roller 17 which rides on cam 18 mounted on main drive shaft 19 which is driven by belt 20 from any suitable source of power. Cooperating with stop 12 in order to separate the desired bunch of bristles is member 21 which is fixed to slide 22 sliding in ways 23 in the main frame 2 of the machine. This slide is operated through yoke member 24 having mounted thereon roll 25 reciprocated vertically by the cam 26 mounted on shaft 3, which is driven from the main shaft 19 by chain 27.

The feed lever 28 feeds the bristles against stop 12, being pivoted at 29 to lever 30 which is pivoted at 31, the lever 30 being actuated by cam 32 thus imparting a vertical movement to lever 30. Horizontal movement of lever 28 is imparted by projection 33 of lever 28 coming in contact with cam 34.

A secondary feed lever 35 is pivoted at 36 to lever 37 which in turn is pivoted at 38, lever 37 being actuated through cam roll 39 and cam 40, the latter being mounted on shaft 41 in brackets 42 fast to the frame 2. The shaft 41 is driven by chain 43 from the shaft 3.

Feed lever 35 is connected by link 50 to bell crank 51, pivoted to the frame 2. Spring 52, through bell crank 51 and link 50, tends to put tension on lever 35, stop 53 limiting movement of bell crank 51 when lever 35 is withdrawn from the bristles.

Tapper 44 evens up one set of ends of the bristles between members 12 and 21 and is reciprocated against said ends through lever 45, to which it is fixed, lever 45 being pivoted at 46 to bracket 47 fixed to frame 2. Lever 45 is reciprocated by link 48 which itself is reciprocated by lever 49 described below.

The picking members 54 and 55 pivoted at 56 are mounted on ear 57 which is part of slide member 58 sliding in guideways 59 in the casting 60 on the bed 1. Said jaws have extensions 61 and 62 connected by links 63 and 64 to a pivot 65 which is connected to rod 66. Pivot 65 has mounted thereon a roll 67. Slide 58 is actuated through link 68 and lever 69, pivoted at 70, by cam 71. The action of the cam 71 moves slide 58 to the right so that the pickers 54 and 55 register with the bunch of bristles to be picked off. The extreme movement of slide 58 snaps the toggle formed by links 63 and 64 to the left by means of the stop 72 on rod 66 coming in contact with the abutment 73. This movement closes the picking members 54 and 55 over the bunch of bristles to be picked off. The slide 58 is then returned to the position of Figure 1 by cam 71.

Roll 67 passes through slot 74 in the upstanding member of slide 58. When the transfer jaws, to be described below, take hold of the bristles the picking members 54 and 55 are opened by means of the bell crank 75 pivoted at 76 coming in contact with the roll 67 and snapping the toggle to the right. The bell crank 75 is actuated by the push-up rod 76ª sliding in guide 77 pushed up by lever 78 pivoted at 79 having mounted thereon a roll 80 actuated by cam 81 on main shaft 19.

It will be readily understood that by the rotation of cam 81 the lever 78 is raised lifting the push rod 76 against the arm of bell crank 75 moving the upstanding arm of bell crank 75 to the right so as to come in contact with roller 67 thereby breaking the toggle to the right. A spring 82 held by ears 83 tends to draw the picker members together and consequently exert tension on the toggle. A stop 84 is mounted on the member 62 to limit the closing movement of the picker members.

Figure 2:
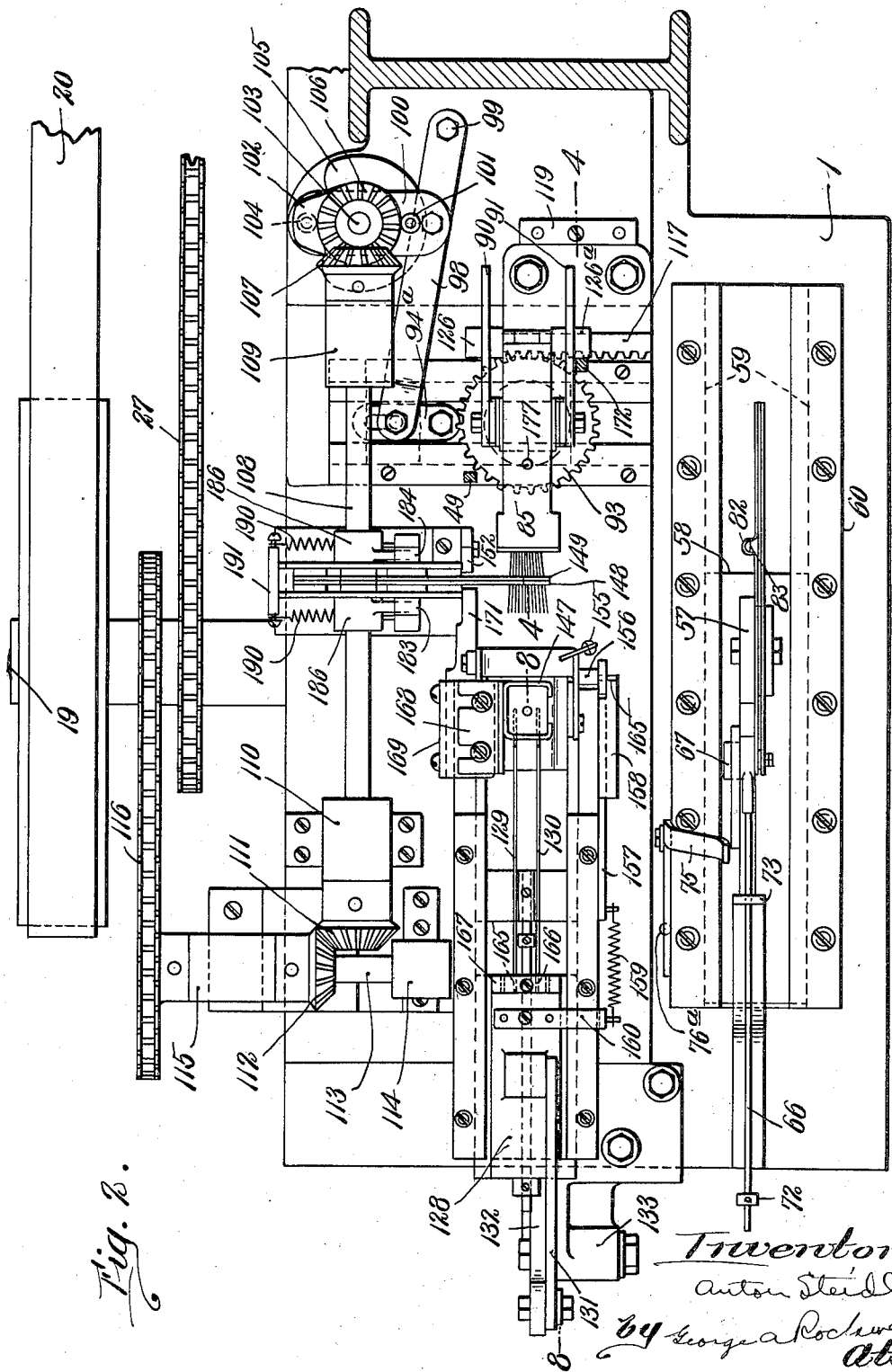
Figure 2 is a plan view of a portion of said machine.
Figure 3:
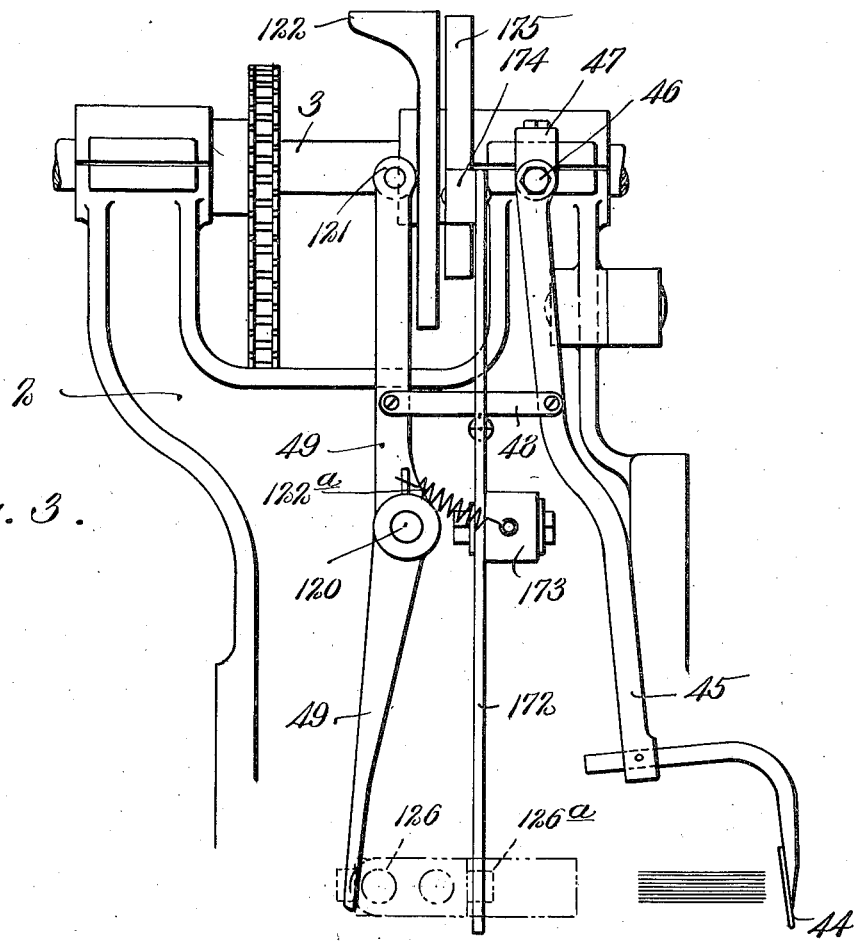
Figure 3 is a partial end elevation of the machine but on a larger scale.

Jaws 85 and 86 transfer the bunch of bristles from the picker members to the position shown in Figure 2. These jaws 85 and 86 are mounted on stud 87 by means of U-shaped brackets 88 and 89. The stud 87 is mounted in side members 90 and 91 which in turn are fastened to a U-shaped member 92 fast to the gear 93, which is mounted in a slide 94 sliding in ways 95 fast to the base 96 by screws 97. The rearward extension 94ª of the slide 94 has mounted thereon a lever 98 pivoted at 99 and is actuated by means of the member 100 having mounted on its top side a roll 101 actuated by cam 102 mounted on vertical shaft 103. Said member 100 has mounted on its lower side cam roll 104 actuated by cam 105 mounted on said shaft 103. Shaft 103 has fast to it bevel gear 106 meshing with bevel gear 107 fixed to one end of horizontal shaft 108 mounted in bearings 109 and 110, the other end of shaft 108 having fixed to it bevel gear 111 meshing with bevel gear 112 fixed to shaft 113 mounted in bearings 114 and 115. The shaft 113 is driven from main shaft 19 by chain 16. Gear 93 is in mesh with rack 117 mounted on bracket 118 fast to bed of the machine, clip 119 being provided.

When the slide 94 moves toward the front of the machine the gear 93 meshing with rack 117 turns the open jaws 85 and 86 through 90° to a position to grasp the bunch of bristles held by the picking members. The closing of the jaws 85 and 86 to grasp the bunch of bristles is effected by means of the lever 49 having pivoted at 120 having mounted thereon a roll 121 actuated by cam 122 mounted on shaft 3. The spring 122ª tends to keep the roll 121 against the cam 122. The rearward ends of the jaws 85 and 86 are provided with toggles 123 and 124 pivoted at 125, upon which are mounted rolls 126 and 126ª sliding in slots 127 formed in the members 90 and 91. By breaking the toggles 123 and 124 by means of lever 49 coming in contact with the roll 126 snapping the toggle to the left into the position shown in Figure 4 the jaws 85 and 86 are closed about the bunch of bristles as shown in Figure 4. When the transfer jaws 85 and 86 have closed on the bunch of bristles the slide 94 is retracted and the jaws rotated to the position of Figure 2 by means of link 98 and the associated mechanism.

Figure 15:
Figure 15 is a view of the article produced by the machine.

Mounted on the slide 128 are two pusher fingers 129 and 130 described below. The slide 128 is reciprocated by means of link 131, lever 132 pivoted at 133 and connected at 134 to fork lever 135 having thereon roll 136 actuated by cam 137 fastened to main shaft 19. Slidably mounted in slide 128 is the rod 138 fast to another slide 139 as best shown in Figure 8. Two stop collars 140 and 141 fast to rod 138 permit lost motion to take place when the slide 128 is reciprocated. When the slide 128 is moved to the right in Figure 8 it picks up the stop collar 140 and through it moves the slide 139, which has pivoted at 142 and 143 the ferrule-carrying jaws 144 and 145. As the slide 128 carrying the pusher fingers 129 and 130 is moved to the right the pusher fingers pick up the bottom ferrule 146 from the magazine 147 and present it to the ferrule-carrying jaws as shown in dotted lines in Figure 11. Further movement of slide 128 moves the slide 139 and jaws 144 and 145 to the right in Figure 8 surrounding the bunch of bristles then held in jaws 85 and 86, the tapered faces 144ª and 145ª pressing the ends of the bristles together so that they are guided part way through the ferrule as shown in Figure 15. The bunch of bristles, after being pressed together, as above described, separate naturally enough to fill the ferrule and frictionally engage its inner wall. As this is taking place jaws 148 and 149 close around the bunch of bristles. Further movement of slide 128 to the right presents the rolls 150 and 151, mounted on the ferrule-carrying jaws 144 and 145, against the wedge-shaped member fixedly mounted on a bracket as shown in Figure 2. It will be clear that as the rolls 44ª and 45ª come in contact with the bevelled faces of wedge 152 the jaws 144 and 145 will open sufficiently to allow the ferrule to remain in said engagement with the bristles whose ends are held by jaws 85 and 86, the jaws 144 and 145 returning to their original position. When the ferrule 146 is presented to the ferrule-carrying jaws 144 and 145 it is brought in engagement with the recesses 153 and 154 as shown in Figure 11 and is so located that the opening between the jaws 144 and 145 at the inner ends of faces 144ª and 145ª is slightly less than the adjacent open end of the ferrule so that the ends of the bristles will be sure to be inserted in the ferrule. Ferrule-carrying jaws 144 and 145 are pressed together by spring 155. Stud 156 is mounted on slide 157 sliding in ways 158 and connected by spring 159 to member 160 fast to slide 128. The end of the stud 156 fits into the recesses 161 and 162 of jaws 144 and 145 shown in Figure 11.

As the jaws 144 and 145 move to the right and are opened by wedge 152 the end of the stud 156 is pressed back by the spring 159 into the recesses 163 and 164 holding jaws 144 and 145 open during the retraction so that the jaws are free of the ferrule until the small end of stud 156 comes in contact with the end 165 of guideway 158. Further movement of jaws 144 and 145 to the left brings the large end of the stud 156 back to position within recesses 161 and 162. The pusher fingers 129 and 130 are held in slots 165 and 166 in slide 128 by clamping bars 167.

The magazine 147 is held in place on the bed by adjustable brackets 168 and 169 and has an opening 170 to allow the bottom ferrule to be pushed to the right in Figure 8 between jaws 144 and 145 by pusher fingers 129 and 130, extension 171 supporting the lower jaw 145 until wedge 152 acts to open the jaws.

The transfer jaws 85 and 86 are opened by means of the lever 172 pivoted at 173 having a cam roll 174 actuated by cam 175 at the desired time, lever 172 coming in contact with roller 126ª mounted on the pivot 125 snapping the toggle 123 and 124 to the right opening the jaws into the position shown in Figure 5, spring 176 surrounding stud 177 fast to the jaw 86, said stud 177 passing through an opening in jaw 85. Said spring puts tension between jaws 85 and 86 by its abutment against said jaws.

The holding jaws 148 and 149 are connected to links 178 and 179 pivoted at 180 on the member 181 fast to the bed of the machine. The pivot 182 of the jaws 148 and 149 has mounted thereon rolls 183 and 184 sliding in slots such as 183a and actuated by cams 186 shown in Figures 13 and 14. Said cams 186 are fixed to shaft 108. It will be clear that as cams 186 rotate as indicated by the arrow in Figure 13 coming in contact with rolls 183 and 184 holding jaws 148 and 149 are closed as shown in Figure 14. To return the jaws 148 and 149 to the open position the levers 187, pivoted at 188 to members 189 and connected to the pivot 182 and having spring 190 connected to member 191 on the member 181 are drawn back opening jaws 148 and 149 to their wide open position. It will be clear that the jaws 148 and 149, as in the case of the other jaws previously described, when closed are side by side and are formed to constitute, when closed, an opening of approximately the size and shape of the ferrule into which the bristles are to be inserted.

In using my machine any desired quantity of bristles are placed in the raceway, lying horizontally, and are pressed forward by member 11 and feeding member 28 and secondary feeding member 35 against stop 12, member 21 separating a number of the bristles to form the desired bunch. Members 28 and 35 act alternately to feed the bristles forward, this alternate action ensuring continuous feeding because either one or the other of said feeding members will always be in action. The tapper 44 acts to even up the ends of the bristles at the forward end of the raceway. The bunch of bristles separated from the rest of the bristles by the stop 12 and member 21 are then picked off by jaws 54 and 55 engaging the exposed ends of the bristles, the stop 12 moving up immediately to engage the bristles to the rear of the picker members as the latter move to the left, these jaws being then brought back to their position in Figure 2 where they are held until the transfer jaws 85 and 86 are rotated 90° into position to receive the bunch of bristles from the picking members. The transfer jaws then grip the bunch and the picking members are opened and the transfer jaws are rotated with the bunch of bristles to the position of Figure 2. A ferrule having been removed from the magazine and placed in the ferrule-carrying jaws, the latter are advanced toward the bristles. Before the ferrule-carrying jaws reach the bristles jaws 148 and 149 close temporarily to bring the bunch of bristles closer together preparatory to insertion between the ferrule-carrying jaws and remain closed until the ends of the bunch enter between the jaws 144 and 145. As the jaws 144 and 145 are moved to the right the ferrule surrounds the bunch of bristles, jaws 148 and 149 having opened immediately after engagement of the ends of the bunch with the jaws 144 and 145 to permit passage of jaws 144 and 145. When the ferrule has been advanced to the desired position surrounding the bunch of ferrule-carrying jaws are opened and then withdrawn leaving the ferrule and bristles held by jaws 85 and 86. Jaws 85 and 86 are then opened allowing the ferrule and bristles to drop onto the bed of the machine, although of course a suitable chute might be provided. It will be understood that the number of bristles in the bunch is sufficient to fill the ferrule compactly so that the bunch and ferrule remain in assembled position with relation to each other when they drop from jaws 85 and 86.

What I claim is:

1. A machine of the character described comprising a support for a quantity of bristles; means to carry a bunch of bristles from said quantity into position to enter a ferrule; a slide; two jaws pivotally mounted on the slide and being interiorly recessed to receive and carry a ferrule between them; means to move said slide and jaws in one direction to bring a ferrule into outside engagement with said bunch; means to open said jaws when the ferrule is in such engagement; and means to move the slide and jaws in the opposite direction.

2. A machine of the character described comprising a support for a quantity of bristles; means to carry a bunch of bristles from said quantity into position to enter a ferrule; a slide; two jaws pivotally mounted on the slide and being interiorly recessed to receive and carry a ferrule between them; means to move said slide and jaws in one direction to bring a ferrule into outside engagement with said bunch; means to open said jaws when the ferrule is in such engagement; means to move the slide and jaws in the opposite direction; and means to hold the jaws open during said movement in the opposite direction.

3. A machine of the character described comprising a support for a quantity of bristles; means to carry a bunch of bristles from said quantity into position to enter a ferrule; a slide; two jaws pivotally mounted on the slide and being interiorly recessed to receive and carry a ferrule between them, one of said jaws being formed with a face sloping inwardly and downwardly and the other with a face sloping inwardly and upwardly, said faces cooperating to guide one set of ends of the bunch of bristles into the ferrule, said faces, at their inner ends, when the jaws are closed, being spaced apart slightly less than the dimension of the adjacent ferrule opening to guide the bristles within the ferrule; means to move said slide and jaws in one direction to bring the ferrule into outside engagement with said bunch; means to open said jaws when the ferrule is in such engagement; and means to move the slide and jaws in the opposite direction.

4. A machine of the character described comprising a support for a quantity of bristles; means to separate a bunch of bristles from said quantity; a slide; jaws mounted on said slide; means to move said slide to bring said jaws in open position into position to engage said separated bunch; means to close said jaws about said bunch; means to move said jaws away from said separating means; means to open said jaws; means to transfer said bunch from said jaws into position to be engaged by a ferrule; and means to move said ferrule into outside engagement with said bunch.

5. A machine of the character described comprising a support for a quantity of bristles; means to separate a bunch of bristles from said quantity; a slide; jaws mounted on said slide; means to move said slide to bring said jaws in open position into position to engage said separated bunch; toggle mechanism to close said jaws about said bunch; means to move said jaws away from said separating means; toggle mechanism to open said jaws; means to transfer said bunch from said jaws into position to be engaged by a ferrule; and means to move said ferrule into outside engagement with said bunch.

6. The combination of a stationary receptacle for bristles; a member to engage and feed the bristles along in said receptacle; and a secondary member engaging and feeding the bristles along in said receptacle and cooperating with the first-mentioned member; and means, independent of the bristles, to actuate said members.

7. The combination of a receptacle for bristles; two members to engage and feed the bristles along in said receptacle; and means to actuate said members alternately to engage the bristles to feed them and to be disengaged from the bristles.

8. The combination of a stationary receptacle for bristles; a member to engage and feed the bristles along in said receptacle; and a secondary member engaging and feeding the bristles along in said receptacle in the same direction as the direction of feeding of the first-mentioned member, said secondary member cooperating with the first-mentioned member; and means, independent the bristles, to actuate said members.

9. The combination of a support for bristles; two members to engage and feed the supported bristles; and means to actuate said members alternately to engage the bristles to feed them and to be disengaged from the bristles.

10. The combination of a support for bristles; a member to engage and feed the supported bristles; and a secondary member to engage and feed said bristles in the same direction as the direction of feed of the first-mentioned member, said secondary member cooperating with the first-mentioned member; and means, independent of the bristles, to actuate said members.

ANTON STEIDLE.